United States Patent
Moeinifar et al.

(10) Patent No.: US 9,704,175 B2
(45) Date of Patent: Jul. 11, 2017

(54) CONVERSATION MANAGEMENT SYSTEMS

(71) Applicants: Shahram Moeinifar, Ontario (CA); Ali Ghafour, Ajax (CA)

(72) Inventors: Shahram Moeinifar, Ontario (CA); Ali Ghafour, Ajax (CA)

(73) Assignee: WhoTheMan Media, Inc. (CA)

( * ) Notice: Subject to any disclaimer, the term of this patent is extended or adjusted under 35 U.S.C. 154(b) by 462 days.

(21) Appl. No.: 14/157,397

(22) Filed: Jan. 16, 2014

(65) Prior Publication Data

US 2014/0201125 A1 Jul. 17, 2014

Related U.S. Application Data

(60) Provisional application No. 61/753,294, filed on Jan. 16, 2013.

(51) Int. Cl.
 *G06N 5/02* (2006.01)
 *G06Q 30/02* (2012.01)
 *G06Q 50/18* (2012.01)

(52) U.S. Cl.
 CPC .......... *G06Q 30/0241* (2013.01); *G06N 5/02* (2013.01); *G06Q 50/182* (2013.01)

(58) Field of Classification Search
 None
 See application file for complete search history.

(56) References Cited

U.S. PATENT DOCUMENTS

| | | | |
|---|---|---|---|
| 9,380,011 B2 * | 6/2016 | Rasmussen | H04L 51/04 |
| 2008/0184122 A1 | 7/2008 | Grant et al. | |
| 2008/0263585 A1 | 10/2008 | Gell et al. | |
| 2009/0144302 A1 | 6/2009 | Baldwin | |
| 2009/0292738 A1 * | 11/2009 | Hurwitz | G06Q 99/00 |
| 2012/0015342 A1 * | 1/2012 | Baldwin | G06F 17/279 434/365 |
| 2012/0041903 A1 * | 2/2012 | Beilby | G06N 3/004 706/11 |
| 2012/0221502 A1 * | 8/2012 | Jerram | G06Q 30/02 706/46 |

(Continued)

FOREIGN PATENT DOCUMENTS

WO 2010044764 4/2010

OTHER PUBLICATIONS

Maghraby, Automatic Agent Protocol Generation from Argumentation, 2011.*

(Continued)

*Primary Examiner* — Stanley K Hill
*Assistant Examiner* — Mikayla Chubb
(74) *Attorney, Agent, or Firm* — Fish & Tsang, LLP

(57) ABSTRACT

Systems and method for conversation management and opinion tracking systems, whereby a conversation management engine can generate on-line conversations based on rules sets such that the generated conversation and the content submitted by participants conforms to a conversation or debate style. The conversation management engine can further implement curation policies that can curate content presented to a conversation such that the presented conversation fits curation rules of the policies. An opinion tracking engine can identify opinions regarding conversation topics based on the submitted contents and detect differences or changes in opinion.

15 Claims, 5 Drawing Sheets

(56) References Cited

U.S. PATENT DOCUMENTS

2012/0260263 A1* 10/2012 Edoja .................... G06Q 30/02
  719/313

OTHER PUBLICATIONS

Palmirani et al, Norma-System: A Legal Information System for Managing Time, 2011.*
CTV News, Should people be taxed on the tips they make?, http://politics.ctvnews.ca/topic.php?topicid=32416&featurePollId=32417, 3 pages, Downloaded on Jul. 10, 2012.
Shark Week Challenge, Frequently Asked Questions, http://www.sharkweekchallenge.com/faq, 1 page, Downloaded on Jul. 10, 2012.
Shark Week Challenge, How it works, http://www.sharkweekchallenge.com/howitworks, 2 pages, Downloaded on Jul. 10, 2012.
Shark Week Challenge, Tournament, http://www.sharkweekchallenge.com/tournament, 2 pages, Downloaded on Jul. 10, 2012.
Shark Week Challenge, Tournament—Sharking Lot vs. Feeding Time, http://www.sharkweekchallenge.com/tournament/videos/sharking-lot-vs-feeding-time, 3 pages, Downloaded on Jul. 10, 2012.

\* cited by examiner

CONVERSATION MANAGEMENT SYSTEMS

This application claims priority to U.S. provisional application having Ser. No. 61/753,294, filed Jan. 16, 2013. This application is also related to U.S. provisional application having Ser. No. 61/449,412 filed Mar. 4, 2011, and U.S. patent application having Ser. No. 13/410,927 filed Mar. 2, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is conversation management technologies.

BACKGROUND

As on-line presences become larger fractions of the lives of on-line users, the users have ever growing number of interactions. Typically interactions take place within comments sections of active web sites (e.g., Amazon reviews, Facebook, new sites, etc.). However, such forums represent single instances of conversation venues that offer little control over the structure of the conversation. At best, participants are able to quote others or nest comments. In extreme examples, human moderators must exert control conversation content by removing content or locking threads. Ideally, owners of web sites or other on-line forums should have an ability to govern behaviors of the conversation itself.

Some effort has been directed to providing on-line video debates. One example of a video debate and comparison platform includes Squabbler™ (see URL www.squabbler.com), which allows for comparison of debater videos. Such techniques have been leveraged by the popular television show Shark Week in June and July 2012 (see URL www.sharkweekchallenge.com/howitworks). The Squabbler technology allows users to rate side-by-side videos and to post comments in a comments section of a web page.

Another example of a debate platform includes Hubbub™ (see URL www.hubub.com) as leveraged by CTV News in Canada (See URL politics.ctvnews.ca). Hubub makes further progress by allowing users to create challenges and present text-based opinions.

U.S. patent application publication 2008/0184122 to Grant el al. titled "System and Method for Conducting On-Line Discussions", filed Jan. 13, 2012, describes a system for presenting video streams as if they had been generated continuously in a debater format. However, the Grant approach only provides for specific debate formats.

U.S. patent application publication 2008/0263585 to Gell et al. titled "System and Method for On-line Video Debating", filed Jun. 15, 2007, also describes a debating platform. The system provides debate rules that the debaters agree to follow. As with Grant, Gell also fails to appreciate that conversations can take on many different forms other than mere debates.

U.S. patent application publication 2009/0144302 to Baldwin titled "Web Application for Argument Maps", filed Dec. 18, 2008, provides some insight into representing meaningful structures of a complex debate. Such an approach can be useful when presenting debate information, but still fails provide insight into structured conversation management.

Yet another example that focuses on debates includes U.S. provisional application publication 2009/0292738 to Hurwitz titled "Conducting an Individualized, Virtually Moderated, Virtual Real Time Methodical Debate", filed May 21, 2009. Similar to Squabble, Hurwitz also provides for uploading videos as part of a debating platform. As with the other cited art, Hurwitz also fails to appreciate that there are myriad other types of conversations beyond debates.

Interestingly, the above citations fail to appreciate that conversations, especially multi-modal conversations, can take on many different forms where each type of conversation could be managed differently. Thus there remains a need for conversation management infrastructure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

The inventive subject matter provides apparatus, systems and methods in which one can leverage a conversation management system to automatically curate content related to a conversation based on various conversation properties, possibly including opinions expressed by the participants or held by the observers. One aspect of the inventive subject matter includes a conversation style management system. Contemplated conversation management systems include a rules database storing one or more conversation rules set where the rules set govern the nature or flow of a conversation among participants. For example, a rules set could govern a style of debate, argument, discourse, lecture, or other form of conversation. The conversation style management system can also include a conversation management engine configured to manage an on-line conversation among the participants according to the rules set. The management engine can obtain conversation criteria relating to a desired type of conversation. Based on corresponding attributes, the engine can identify one or more rules sets having attributes that satisfy the conversation criteria. The engine can use the rules set or sets to configured a conversation interface (e.g., cell phone, browser, game console, etc.) to present the conversation according to the selected rules set.

Another aspect of the inventive subject matter includes a method of curating conversation content. Contemplated methods include providing access to a conversation management engine (e.g., server, virtual machine, PaaS, IaaS, SaaS, etc.), possibly via a conversation interface (e.g., a browser, a cell phone, a game console, a web site, etc.). The management engine generates as conversation curation policy, in some embodiments based on a template, where the policy comprises rules governing an on-line conversation. As the engine obtains conversation content related to the, the engine curates or otherwise organizes the content for presentation via an output device. On-line conversations can take on many different forms including discussions, debates, arguments, lectures, or other forms of discourse. Each type of conversation can be curated by a corresponding policy.

Yet another aspect of the inventive subject matter includes an opinion tracking system that can include a conversation interface, an opinion database configured to store one or more opinion metrics, and an opinion analysis engine. The conversation interface is configured to obtain content related to an on-line conversation from one or more participants. For example, the conversation interface could include a browser through which uses can have a debate or conversation about a product review. The opinion database can keep an ever growing compilation of opinion metrics including metrics that reflect a real-time analysis of the on-line conversation. The analysis engine monitors or otherwise observes the on-line conversation and derives the opinion metrics from the conversation content. Further, the analysis engine can derive a difference of opinion based on the derived opinions and those stored in the database, possibly where the difference in opinion is among participants in the on-line conversation or difference in opinion over time.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
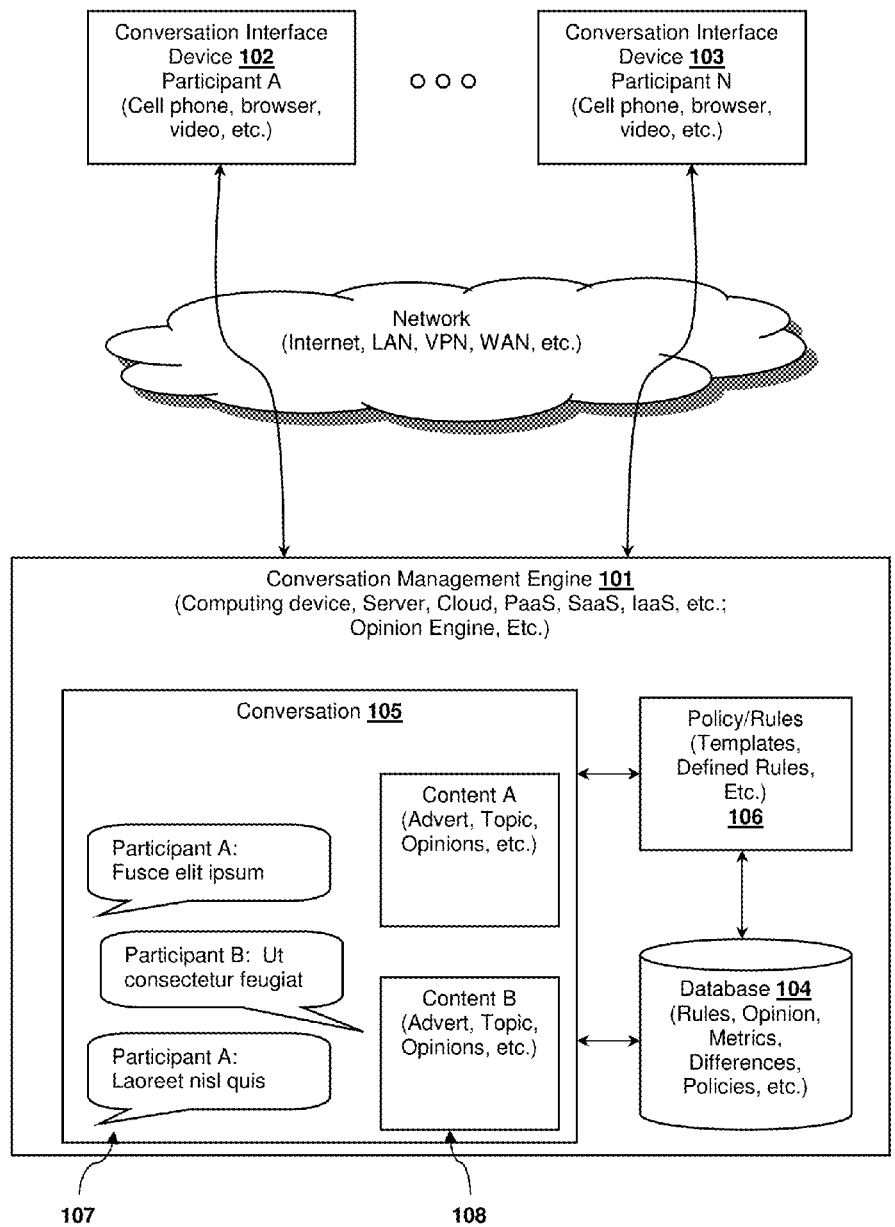
FIG. 1 is a schematic of conversation management ecosystem.

It should be noted that while the following description is drawn to a computer/server based conversation management, curation and/or opinion tracking systems, various alternative configurations are also deemed suitable and may employ various computing devices including servers, interfaces, modules, clients, portals, systems, databases, agents, peers, engines, controllers, computing infrastructures, or other types of computing devices operating individually or collectively. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, cellular, or other type of packet switched network.

One should appreciate that the disclosed techniques provide many advantageous technical effects including generating one or more electronic signals capable of configuring remote computing devices to present on-line conversation content according to one or more conversation rules sets.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, the terms "coupled to" and "coupled with" are also used euphemistically to mean "communicatively coupled with" where two or more network-enabled devices are able to communicate with each other over a network, possibly via one or more intermediary devices.

In FIG. 1, participants A through N can participate in a conversation managed by a conversation management engine 101. The participants can access the conversation management engine 101 via conversation interface devices 102 and 103, through which they can interact with each other on-line. Examples of conversation interface devices 102,103 can include smart phones, PDAs, game consoles, appliances, kiosks, televisions, or other forms of electronic devices capable of data exchange with the conversation management engine 101. The conversation interface devices 102,103 can enable participants to engage in conversations managed by a conversation management engine 101 via a user-facing interface presented on conversation interface devices 102,103 capable of accepting input from a user and presenting output to the user. Examples of the user-facing interface include an application installed in the interface device and a website presented via a device's web browser.

The conversation management engine 101 is communicatively coupled with interface devices 102,103 via a data exchange network (e.g., the Internet, WAN, LAN, VPN, cellular network, etc.), whereby the engine 101 can exchange conversation content with the devices 102,103. The content exchanged can be considered to be input or contributions into a conversation, such as by participants. As such, the content can be thought of as a participant's or other contributor's expression or comment provided to the conversation. One should appreciate that the conversation content can include a broad spectrum of data modalities including text, video, audio, images, emoticons, or other types of data modalities. Conversation content can comprise video data, audio data, image data, link data, text data, metadata, rating data, voting data, and ranking data. FIG. 1 depicts collective content 107 and collective content 108 within instantiated conversation 105. Content 107,108 can include participant content, advertising content, promotional content, sponsor content, etc. In the illustrated example of FIG. 1, content 107 can be considered to represent participant-submitted content in textual form, as submitted by participants "A" and "B". Content 108 can be considered to be advertiser content, sponsor content, or other non-participant or non-textual content. It is contemplated, however, that advertiser or sponsor content can be presented in the format of content 107 to appear to be a natural part of the conversation. Likewise, it is contemplated that content 108 can include participant-provided content such as images, video clips, audio clips, etc. in addition to or instead of content 107.

In embodiments, conversation content can include content attributes, corresponding to characteristics of the content. Content attributes can include words, word associations, text, phrases, sounds, or other parts of the content itself. Additional examples of content attributes can include a content topic, a content format, a content demeanor (e.g., combative, angry, humorous, aggressive, passive, etc.), a content position, content size, content length, content creator identifier, content originating device identifier, etc. Content attributes can include values indicating a magnitude, amount, state, identifier, or other observable quantitative or qualitative condition of the attribute.

In embodiments, the conversation management system 100 of FIG. 1 can include one or more databases 104 configured to store rules related to conversation management. Each conversation rules set can be configured to govern a specific type or style of conversation. For example, rules sets can be defined that govern a debate. In embodiments, one or more rules sets can be used to govern curation of conversation content, or to govern disposition of scores or winners related to competitive conversation.

Databases 104 is intended to collectively refer to one or more databases configured to store the different information/data components referenced herein, related to various aspects of the inventive subject matter (e.g., conversation rules sets, curation criteria, curation rules sets, templates, opinion metrics, derived opinion differences, etc.). As such, the database 104 is intended to collectively represent the various databases discussed herein (e.g., rules databases, curation databases, opinion metric databases, etc.)

Rules/Policy 106 is intended to collectively illustrate the retrieval of conversation rule sets, curation rules sets and/or policies, curation templates or other described a priori rules and templates, etc. from their corresponding databases 104, and their respective functions related to the instantiation, presentation and use of the conversation 105 according to the inventive subject matter.

Conversation style rules sets can represent a broad spectrum of styles. In some scenarios, a manager can create a custom rules set where the custom rules set reflects a preferred type of conversation. Likewise, the manager can modify rules within a rules set to customize the degree to which a rule can regulate a conversation. Examples of rules in a conversation rules set can include conversation topic rules, conversation language rules (e.g., language formalities required by or reflective of proper decorum in a particular conversation style, such as addressing another participant or an audience in a certain way; can include rules associated with limiting profanity), participant behavior rules (e.g., beyond language, can govern removing participants whose behavior goes outside the rules, such as via personal attacks to other participants), conversation modality rules (e.g., a particular conversation style only allows for textual debate, verbal debate, allows for visual support in the form of images or video, etc.), length of content by participants rules (e.g., allowed length of comments, replies, or other expressions; can be by length of text, by length of video or audio expression, etc.; can correspond to one or more particular stages of conversation, such as initial remarks, rebuttals, answers, etc.), number of participants rules, number of content rules (e.g., how many content submissions are allowed in a conversation before it is declared over; can be total or by participant), number of conversation rounds, languages of conversation (e.g., conversation limited to only English, English and French, etc.; can be restricted to these languages or can be recommended languages for engaged participation), target participants (i.e. the target audience for the conversation), etc.

Conversation rules sets can correspond to different styles of debates, whereby the conversations governed by these rule sets correspond to debates. Examples of debates represented by these conversation rules sets can include a competitive debate, parliamentary debate, a decision making debate, an Oxford debate, a Mace debate, a Lets debate, a public debate, an Australasia debate, a WUPID debate, an Asian Universities debate, a policy debate, a classic debate, an extemporaneous debate, a Lincoln-Douglas debate, a Karl Popper debate, a simulated legislature debate (e.g., Congressional debate, Model UN, etc.), an impromptu debate, a mock trial, a moot court, a public forum debate, a Paris debate, or other type of debate. The rules within the conversation rule sets representing a debate can reflect the rules for the particular debate, such that the participants in the conversation comment (by way of submitted content) and otherwise interact with the conversation according to the rules of the represented debate. These rules can include rules associated with the formalities and procedural requirements of a corresponding debate style, including content language, length of content (e.g. time duration for video or audio, text length such as paragraph length or word count for text), order of content, rounds of debate, format of content, content of comments or other expression expressed via content, participants and role of participants, etc. For example, a Karl Popper debate rules set can include rules limiting the number of participants per side of the debate, a time or length (for text-based content) of each debating side's participants' statements, rebuttals, the order in which content items are presented, the formatting of questions to the opposing side, etc.

Other contemplated styles of conversation reflected by conversation rule sets can include an on-line flame war, a product review discussion, a simulated website forum (e.g., reflecting the conversation or debate style of communities of particular websites such as reddit.com, 4Chan, social networking sites, etc.), an argument, a survey, a lecture, etc.

In embodiments, the conversation rules sets can correspond to with situational or "role-playing" style conversations, whereby the conversation participants are required to participate according to situational, contextual and/or contemporary restrictions or limitations associated with a situation, circumstance or role related to a topic, theme or forum of conversation. For example, in a conversation about a particular historical time period or particular historical event, the conversation rules sets can include rules that limit participants' content contributions to expressing knowledge that was available to people in the historical time or during the historical event. In another example, rules in a conversation rules set can require that participants playing roles in a conversation can be limited to commenting "in character", whereby their content expressions can be restricted by circumstances and conditions associated with a role. In this example, a participant in a conversation who is discussing topic from the perspective of a person during a time where that person (either as an individual, or as part of a group to which the person belonged to at the time) was oppressed, persecuted, censored or otherwise limited in their capacity or ability for expression (e.g., by government or law, by peers, by societal norms, by physical or mental condition, etc.) would be limited by rules in the conversation rules set to content expressions consistent with the circumstances of the person. The limitations imposed by these rules for "in character" participants can include limitations on comment length, comment speed, comment content, comment demeanor (e.g., aggressive vs. passive tone of a comment), intended recipient(s) of comment, amount of permitted comments, permitted language or vocabulary in comment, etc.

Each conversation rules set can include one or more conversation style attributes that represent the nature or characteristics of the corresponding conversation style. The style attributes can be considered metadata or tags bound to the rules set, which can then be used to identify or recognize rules sets. In more interesting embodiments, conversations 105 themselves can be treated like data objects (i.e., conversation objects), which also comprise conversation attributes. In such embodiments, the conversation attributes and style attributes can adhere to the common namespace in a manner where attributes from one can be used to recognize or identify the other. In embodiments, conversation style attributes and conversation attributes can include values indicating a magnitude, amount, state, identifier, or other observable quantitative or qualitative condition of the respective attribute.

The conversation management engine 101 is represented in FIG. 1 as a server. However, the engine 101 can include any suitable computing infrastructure capable of hosting the disclosed roles or responsibilities. In embodiments, the conversation management engine 101 can be embodied as computer-executable instructions stored on one or more non-transitory computer-readable media that, when executed by one or more hardware processors, cause the processor(s) to carry out various functions and processes associated with the inventive subject matter. In embodiments, the conversation management engine 101 can operate as a for-fee service through which third party web sites offer access to on-line conversations. Thus, a news web site or consumer web site could provide access to the conversation services via a web service interface so that the conversation appears as if it is hosted by the third party web site. Example computing infrastructures that can be used to implement conversation management engines include Software as a Service (Saas), Platform as a Service (Paas), Infrastructure as a Service (IaaS), a virtual server, a cloud-based service (e.g., Amazon EC2, etc.), an HTTP server, or other form of computing devices. The disclosed technologies can be implemented based on the services provided by Viafoura™ (see URL www.viafoura.com) and as discussed in co-owned U.S. provisional application having Ser. No. 61/449,412 filed Mar. 4, 2011, and U.S. patent application having Ser. No. 13/410,927 filed Mar. 2, 2012.

Figure 2:
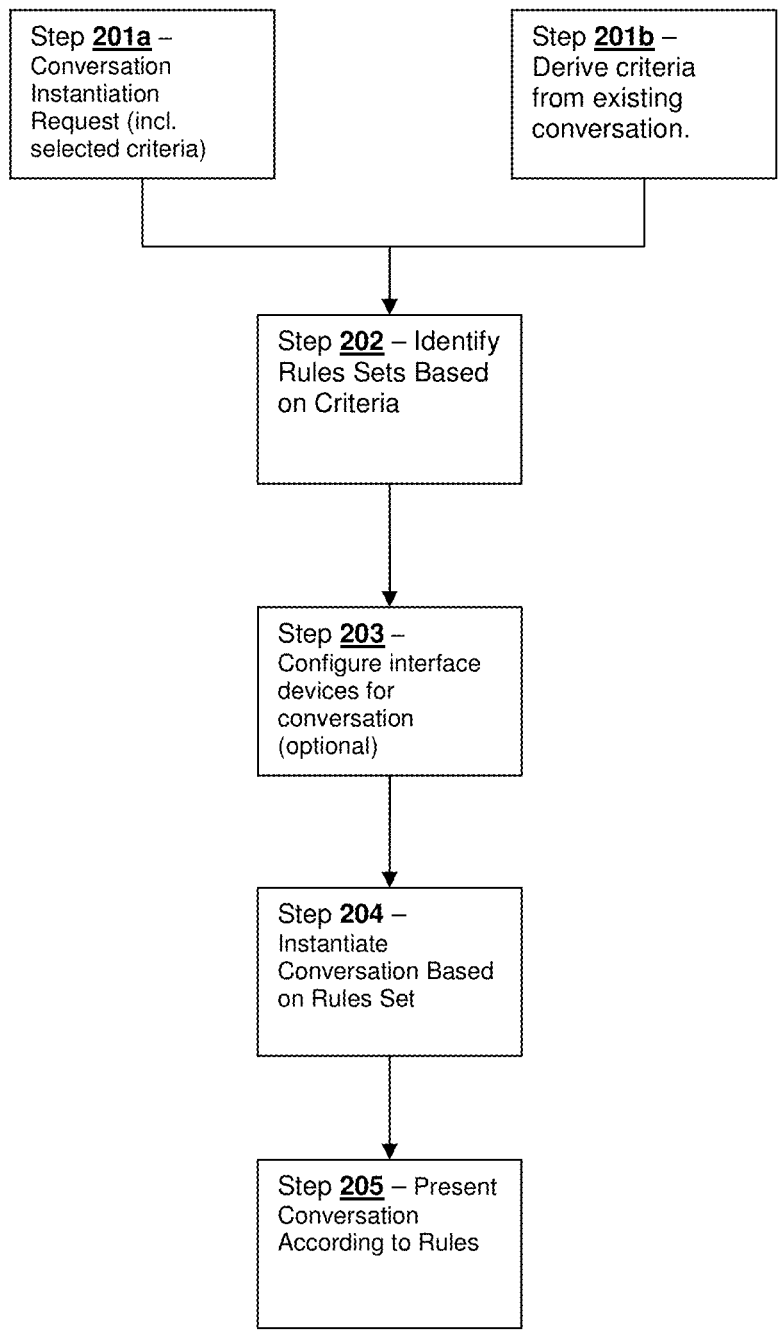
FIG. 2 is an overview of an example method of generating and managing a conversation.

FIG. 2 provides an overview of an example method of generating and managing a conversation, according to the inventive subject matter.

To instantiate a conversation, the conversation management engine 101 can first obtain conversation criteria defined in terms of conversation attributes and relating to a conversation. FIG. 2 illustrates two variations of the conversation management engine 101 obtaining the conversation criteria related to a conversation, at steps 201a or 201b.

At step 201a, a user can request the instantiation of a conversation based on provided conversation criteria comprising conversation attributes. The user can be a participant in the conversation, and submit the request via a conversation interface device 102,103, or can be a user such as a website administrator who wishes to host an instantiated conversation. For example, a client of the conversation services operating system can submit a request for infrastructure supporting a product review conversation. In embodiments the conversation criteria for inclusion in the request can be provided for selection by a user via a drop-down menu or other presentation of available criteria. In embodiments, the user can be enabled to provide keywords that can be used in searching for applicable conversation criteria.

Alternatively, at step 201b, the conversation management engine 101 analyzes an on-line conversation to derive conversation attributes (e.g., aligned or opposed opinions, participant interactions, etc.) to determine a most likely de-facto style of conversation. The conversation being analyzed can be a conversation that a user desires to manage via the conversation management engine 101, whereby the conversation is to be converted to an instantiated conversation, and can be allowed to continue under the rules of the instantiated conversation. Alternatively, the conversation being analyzed can be an on-going online conversation or a historical one that has concluded, such as one that can be considered a "model" conversation for the online community given a particular topic, level of participation (e.g., number of participants, level of engagement, etc.), quality of discussion, and/or other factors.

In embodiments, the conversation management engine 101 can analyze the on-line conversation via one or more of keyword recognition techniques, audio recognition techniques, context recognition techniques, feedback analysis during the conversation, analysis of reputations of participants, etc.

In embodiments, the conversation criteria is considered to comprise the derived attributes. In other embodiments, the derived attributes are mapped to corresponding conversation attributes of a plurality of pre-determined conversation criteria, which can have more or different conversation attributes than those derived, to determine one or more closest matches. The mapping can be one-to-one, one-to-many, or many-to-one. Alternatively, the conversation criteria can be selected based on the statistical analysis (e.g., via clustering algorithms, nearest-neighbor algorithms, etc.) of the derived attributes and the conversation attributes across the conversation criteria.

The embodiments utilizing step 201b enable the engine 101 to automatically select rules sets based on the criteria at step 202.

Regardless of the form of the conversation attributes and how the conversation criteria is obtained, the conversation criteria can be considered selection criteria used to find relevant rules set. In addition to the conversation attributes described above, the conversation criteria can include requirements or optional conditions.

At step 202, the conversation management engine 101 uses the conversation criteria to search the database 104 and identify rules sets having conversation style attributes that can be considered to satisfy the criteria. In embodiments, a conversation style attribute can correspond directly to a rule in a rules set, wherein the conversation style attribute is considered to be the rule itself expressed in the namespace of conversation style attributes. Thus, the engine 101 can be used to create an on-line conversation system that meets the desired criteria or to recognize an existing on-line conversation as adhering to a specific style.

Figure 3:
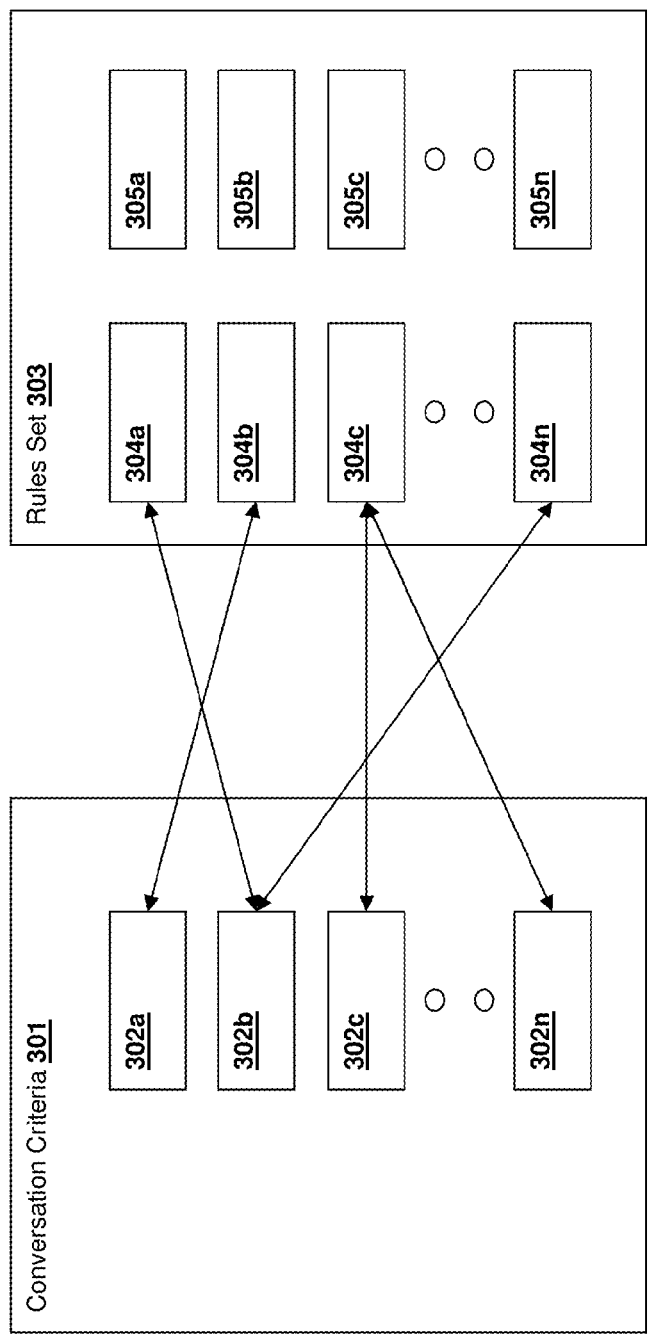
FIG. 3 is an illustration of a sample mapping between conversation criteria attributes and conversation style attributes of a conversation rules set.

The conversation management engine 101 can identify rule sets satisfying the criteria by mapping one or more conversation attributes of the criteria to corresponding conversation style attributes of the rules sets. Conversation attributes of conversation criteria and conversation style attributes of rules sets can be of a same namespace, and can be mapped according to correspondence rules that dictate the mapping. FIG. 3 illustrates an example of a mapping between conversation attributes 302a-302n of conversation criteria 301 to corresponding conversation style attributes 304a-304n of rules set 303 (also shown having rules 305a-305n). The mapping can include one-to-one mapping (such as when a conversation attribute of the conversation criteria correlates directly to a corresponding conversation style attribute, illustrated via the mapping of conversation attribute 302a to conversation style attribute 304b), one-to-many mapping (e.g., the mapping of attribute 302b to attributes 304a and 304n), or many-to-one mapping (e.g., the mapping of 302c and 302n to attribute 304c). In embodiments, criteria satisfaction can require a mapping or other correlation of corresponding attributes (such as between the various conversation attributes 302a-302n and the various conversation style attributes 304a-304n) as well as attribute values meeting certain thresholds or conditions.

In embodiments, one or more rules sets can be returned from the database 104, in which case the rules sets can be ordered or ranked according to how well their style attributes satisfy the conversation criteria. In one aspect of these embodiments, the conversation management engine 101 can offer the ranked or ordered candidate rules set to a user (e.g., a participant, via interface device 102,103 or another user via another computing device communicatively coupled to the engine 101) and allow the user to select one or more rules sets from the candidate rules set. In another variation of these embodiments, the conversation management engine 101 can be configured select one or more rules sets. For example, the conversation management engine 101 can be configured to select the one or more rule sets based on the ranking and how well the ranking rule sets met the criteria, and can be configured to limit the number of selections to a maximum number (e.g., top 3 rules sets meeting the criteria). In these embodiments, the ranking of the rules sets, and either the presentation of ranked rule sets to the user and receipt of a user selection or the automatic selection of one or more rule sets by the engine 101 can be performed as part of step 202.

Optionally, at step 203, the engine 101 uses the identified one or more rules sets to configure one or more conversation interface devices 102,103 to present the conversation. Configuring the one or more conversation interface devices 102,103 can include one or more of causing one or more of the devices 102,103 to update one or more applications, download new applications, receive a link to a webpage that will host the conversation, providing login instructions to a participant, providing conversation rules or instructions to a participant, assigning a conversation role to a participant, testing network reliability, etc.

Once the conversation management engine 101 has a selected rules set, it instantiates a corresponding conversation 105 at step 204, assuming it does not yet exist. The instantiated conversation 105 can be considered a persistent data object that provides a conversation platform through which participants interact according to the rules of the rules set. Thus, the conversation object reflects the style or type of conversation. The conversation object can be instantiated on the engine 101 itself, hosted on the engine 101 while presented via a third party web site, or even instantiated on the third party web server assuming it has suitable capabilities or authority.

Where a conversation already exists, the conversation management engine 101 imposes the rules of the rules set over the existing conversation and subsequent content submissions by participants, such as by replacing existing conversation rules with those of the rules set, or instantiating a new conversation to replace the previous one according to the rules set and including all of the conversation content in the conversation prior to the instantiation.

At step 205, the conversation management engine 101 presents the conversation 105 to participants via interface devices 102,103, according to the one or more rules sets used to instantiate it. In presenting the conversation 105, the conversation management engine 101 receives content from participants via the conversation interfaces 102,103 and the conversation management engine 101 maps the content to the corresponding on-line conversation 105. This mapping can include an analysis of received content to ensure compliance with the rules of the conversation. The analysis can include an analysis of content format, length, the content itself, and other content attributes to determine compliance with the conversation rules. If submitted conversation content does not comply with the conversation rules, the conversation management engine 101 rejects the content and refrains from adding it to the ongoing conversation 105. In embodiments, the conversation management engine 101 can send a notification to the submitting participant informing them that their content was rejected. The notification can include the reason for rejection, such as the rule that was not complied with, such that the participant can edit the content to comply and resubmit the content.

The enforcement of the rules set for a conversation by the conversation management engine 101 can include warnings and ejections of participants, based on the behavior of the participants. This can include warnings and ejections of participants based on a number of rules violations (e.g., during an overall conversation or within a particular period of time), a particular rule violation and/or of a particular severity (e.g., such as submitting content of a particular degree of profanity or obscenity), and other criteria designed to eliminate "trolling" or other undesired behavior by malicious individuals.

Further, the conversation management engine 101 can be configured to curate the content within the conversation according to curation rules set corresponding to a curation policy. It should be appreciated that the curation rules set could include curation rules dictating how various forms conversation content can be managed. Example types of data that can be curated include conversation audio data, video data, image data, link data, text data, metadata, rating data, voting data, ranking data, or other forms of data.

In the example illustrated in FIG. 1, conversation 105 can be considered to depict a curated conversation. As such, the arrangement of the conversation 105 whereby content 107 corresponds to participants "A" and "B" and content 108 corresponds to advertisements, topic content, opinion content, etc. (as illustrated in FIG. 1) can be the product of applied curation policies to the conversation.

Curation rules sets can include rules that govern the presentation of a conversation 105 and the content within the conversation 105 to one or more participants via their corresponding interface devices 102,103. For example, curation rules can include rules associated with a conversation appearance, content location within a conversation, modification of content (e.g. adding, removing or otherwise editing at least part of submitted conversation content, such as the content itself, a length of a content, words or phrases within content, attachments to content, etc.), addition of content, removal of content, rearranging of content, etc.

The curation policies can include various rules governing how content should be presented within conversation 105. Thus, methods of curation of conversation content dictated by the curation policies can include filtering content (e.g., removing profanity), modifying content (e.g. adding, removing or otherwise editing at least part of submitted conversation content, such as the content itself, a length of a content, words or phrases within content, attachments to content, etc.), determining content location within a conversation, adding content, removing content, rearranging of content, or other forms of managing content. Curation policies can be applied in real-time to content as is received to be presented in the conversation, as well as to content already presented in conversations that have already started. For example, after a conversation has started or during a real-time conversation, the curation policy can be modified, which in turn can cause a change to the arrangement of the existing conversation content. Such modifications can be achieved by including time-based curation rules within the curation policy where the rules could take effect periodically or based on triggered events (e.g., a new advertiser wins an auction associated with the conversation).

Consider an example where participants interact in a forum where they express their opinions, such as a product review comment section of a retailer site. As the participants continue their conversation, their opinions (e.g., sentiments, pros, cons, etc.) can change with time. A corresponding curation policy can curate the content according to how the opinions change. Thus, the curation policy can govern placement of conversation content according to participant attributes, the participant attribute being the opinion in this example. Other examples of participant attributes can include a participant identifier, a participant status in the conversation, a participant reputation, a participant role in the conversation, etc. Further, the curation policy can change the curation or arrangement of content just for a specific entity, an observer, a participant, a group, an affiliation, or for an entire conversation.

Curation rules sets, generated curation policies, a priori curation policies, and other information associated with curation functions and processes can be stored on a curation database, such as database 104.

In view that the conversation management engine 101 can manage an on-line conversation, the inventive subject matter is considered to include methods of curating conversation content, such as via the conversation management engine 101.

The astute reader will recognize that a curation policy can, but does not necessarily have to, correspond to the conversation rules set of a conversation. In embodiments, the two types of objects can have conceptual overlap or influence each other. However, in other embodiments, the curation policy can function complementary to the rules set that enforces a conversation style. As such, curation policies can be combined with other rules sets as desired to create a more rich conversation environment.

In an illustrative example of embodiments where overlap exists between the conversation rules set of a conversation and the curation policy, the conversation rules of the rules set can serve to dictate one or more of the rules of the curation policy. In this example, the curation policy manages the presentation of the content based on the acceptance of the content by the conversation rules set. In one version of this example, the curation policy is simply used to present content approved by the conversation rules set "as is", without modification. In another version of this example, the curation policy can dictate how content is "touched up" to better fit the conversation style (e.g., making minor changes to vocabulary, tenses, etc., used in content, cleaning up links, etc.), without substantively changing the submitted content.

In a second illustrative example of embodiments where overlap exists between the conversation rules set of a conversation and the curation policy, conversation rules of the rules set can be associated with rules of the curation policy, wherein the curation policy serves to modify or further restrict the rules of the rules set. For the purposes of this example, the conversation rules for a particular conversation dictate that video or audio content for a participant cannot exceed 2 minutes, whereas the curation policy dictates that the video or audio content for a participant cannot exceed 1 minute. Thus, the conversation management engine 101 can approve a participant's submitted audio content that is 1 minute, 30 seconds long for inclusion into the conversation. However, under the curation policy, the audio content is too long for inclusion into the conversation. In one version of the example, the conversation management engine 101 can return a notification to the participant indicating that the audio clip is appropriate for the conversation style, but too long to include in the presented conversation. In another version of the example, the conversation management engine 101 can perform editing of the audio clip such that the clip conforms to the curation rules.

In an illustrative example of embodiments where no overlap exists between the conversation rules set of a conversation and the curation policy, the curation policy can manage certain aspects content irrespective of the conversation rules set applied to approve content for inclusion. As such, a conversation rules set can specifically govern how participants interact with each other through specific interface widgets while the curation policy can govern which promotions should be displayed in conjunction with the presented conversation content, and in what fashion the promotions should be displayed. In another example, the curation policy can include rules that filter profanity for a particular participant. In this example, the conversation management engine 101 can approve content submitted by all participants for inclusion into the conversation according to the conversation rules set, whereas the curation policy for the individual participant can modify the presentation of content within the conversation for that participant alone.

In embodiments, the conversation management engine 101 can inject additional content into the conversation 105 as conversation content based on the conversation criteria, style attributes, conversation attributes, other content, or other factors, and according to one or more of the conversation rules set and the curation policy associated with the conversation 105. For example, promotions or advertisements can be injected into the instantiated conversation 105 base on one or more of these factors and in compliance with applicable conversation rules set governing the conversation, in compliance with a curation policy, or both.

As circumstances dictate or allow based on the conversation content or other conversation factors, the conversation management engine 101 can obtain an advertisement, possibly from an advertisement server, and inject it into the conversation in exchange for a fee. For example, advertisers can bid on exclusivity for presenting their advertisements into a conversation based on content, style, participants, or a particular state that the conversation is in.

Similar to advertising, the systems and methods of the inventive subject matter can further include allowing a sponsor to endorse or sponsor a conversation. Such embodiments can be leveraged in competitive conversation such as debates or comparison product reviews. Sponsorship could also be auctioned if desired.

In embodiments, content injected by the conversation management engine 101 can be injected into a conversation 105 based on the curation policy alone, without being subject to the conversation rules set. For example, in a conversation 105 where the content is text-only according to the conversation rules set, the curation policy can enable the injection of an advertisement into the conversation 105 in the form of an image or other non-text content format.

Figure 4:
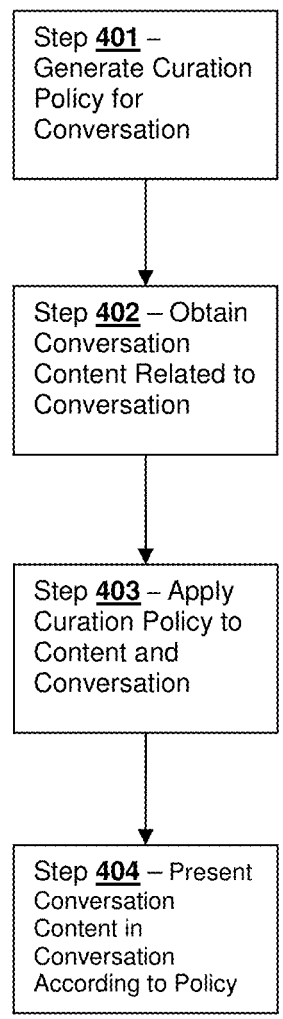
FIG. 4 is an overview of an example method of curating conversation content.

FIG. 4 provides an illustrative example of a method of curating conversation content. The functions and processes associated with the method illustrated in FIG. 4 can be executed by the conversation management engine 101.

At step 401, one or more conversation curation policies associated with the on-line conversation 105 are generated. A curation policy can be established based, at least in part, on one or more selected curation rules sets. In embodiments, the curation rule sets used to generate the can be selected by a user (e.g., a host of the conversation, a conversation administrator, one of the participants, the creator of the conversation, etc.). In embodiments, the curation rule sets can be selected based on the conversation rules set of the conversation 105, such as via a matching based on established correlations.

In embodiments, the generation of the curation policy at step 401 can comprise obtaining an a priori defined policy, such as a template, from the curation database. Providing access to a priori defined curation policies can allow for the efficient generation of policies applicable to a plurality of conversation types without requiring individual policies for each conversation to be generated from scratch. For example, if a third party develops a conversation curation policy, then the policy could be provided to others in exchange for a suitable payment.

In embodiments, these defined curation policies can be edited, enabling the generation of customized policies from a base or template policy. Thus a third party can instantiate a custom policy by modifying the template. In these embodiments, step 401 can include obtaining a template from the curation database and modifying the template based on the selected curation rules sets.

At step 402, the conversation management engine 101 obtains conversation content related to the on-line conversation 105. The conversation content obtained at step 402 can be content submitted by one of the participants, or can be other content such as advertisement or sponsored content. As discussed above, a curation policy can be applied to participant-submitted content in real-time (i.e., as it is received by the conversation management engine 101; preferably after the content has been approved according to the conversation rules set of the conversation, but can be prior to approval by the conversation rules set) and prior to the presentation of the content in the conversation 105, as well as to existing content previously presented in the conversation 105. As such, "obtaining" conversation content can include receiving new content to consider, identifying previously existing content in a conversation already in progress for analysis, and retrieving additional content stored in databases 104 or other databases (such as the advertisement or sponsored content described above).

At step 403 the conversation management engine 101 applies the curation policy to the received content. This can be performed by analyzing content attributes against curation policy rules (such as via matching, statistical analysis algorithms, etc.). The results of the analysis serve to determine how the curation policy will affect the received content and the conversation as a whole based on the received content. For example, if a curation policy requires that content be under a maximum length, content exceeding that length can be modified to fit the maximum length, outright rejected, etc.

At step 404, the conversation management engine 101 presents the conversation content within the according to the curation policy. As part of step 404, the conversation management engine 101 can also configure the conversation interface presented via the conversation interface devices 102,103 to present the conversation with the conversation content according to the curation policy.

Yet another aspect of the inventive subject matter includes an opinion tracking system, where the conversation management engine 101 can operate as an opinion analysis engine. As the conversation management engine 101 can perform the functions of the opinion analysis engine, the opinion tracking system can be integral to the conversation management system 100 depicted in FIG. 1. In other embodiments, the opinion analysis engine operates as a companion server or engine to the management engine 101. For the purposes of discussion of the opinion tracking aspects of the inventive subject matter, the conversation management engine 101 is considered to be further configured to perform the functions and processes of the opinion analysis engine. As such, in the discussion of the opinion tracking aspects of the inventive subject matter, "conversation management engine 101", "analysis engine 101" and "opinion analysis engine 101" can be used interchangeably.

Opinion tracking systems can include the conversation interfaces presented via interface devices 102,103 (e.g., a web server, a mobile phone, an API, a web service, a mobile computer, a browser enabled device, an appliance, a game console, etc.) as illustrated in FIG. 1 where the interface devices can obtain conversation content related to the on-line conversation. Further the system can include an opinion database, which can include one or more databases 104, that is configured to store one or more opinion metrics associated with the on-line conversation.

Figure 5:
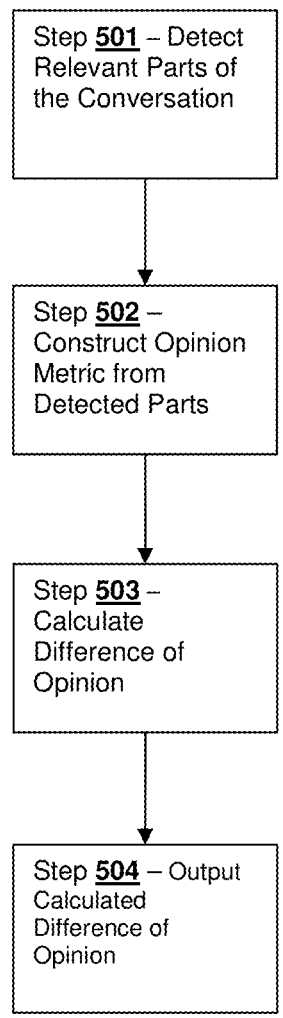
FIG. 5 is an overview of an example method of tracking participant opinions.

FIG. 5 illustrates an example method of tracking participant opinions for a conversation and determining changes or differences in opinion, according to aspects of the inventive subject matter.

As the analysis engine 101 observes conversation content, it can derive a current opinion metric from the content. For example, the analysis engine 101 can be configured to map words, phrases, text, audio, and/or gestures to opinion objects formed according to a normalized opinion space.

At step 501, the analysis engine 101 detects one or more relevant parts (e.g., words, text, phrases, audio, gestures, etc.) of content in a conversation 105. For example, a participant states in a video that they "love" the characters in a book, but "dislike" the plot. In response, the analysis engine 101 can be configured to detect, at step 501, the words "love", "characters", "dislike" and "plot" via speech recognition techniques.

At step 502, the analysis engine 101 constructs an opinion metric from the detected parts of the content. In the example above, the analysis engine 101 constructs an opinion metric from the words "love" and "characters". In this example, the analysis engine 101 can assign a score, perhaps as score of 10 out of 10, to the concept of "characters" indicative of a favorable opinion. Similarly, the analysis engine 101 can assign a negative score to the concept of "plot", perhaps −5 out of −10, to indicate a negative opinion.

It should be appreciated the concepts of "characters", "plot", "love" and/or "dislike" can be derived from the content, from a topic of the conversation, or could be a priori defined as concepts in the opinion space. Although the example assumes a range, the opinion could also include just a sentiment (e.g., positive, neutral, negative, NULL). The opinion metrics can be single valued or multi-valued (e.g., vector, N-tuple, averages, statistics, etc.), possibly aligned with a topic as in the example presented. The members of a multi-valued opinion metric, such as a vector, can represent a plurality of topics associated with a conversation or a plurality of concepts within a topic. The derived opinion metrics can be stored in opinion metric databases, such as databases 104, for later use.

In a particularly interesting embodiment, the analysis engine 101 can be configured to calculate a difference in opinion between the current metric and those stored in the database, performed at step 503. For example, the difference in opinion could be the difference between participants in the conversation or could be a difference in opinion as a function of time. As the participants continue with their conversation, the analysis engine can calculate the difference in opinion in real-time to illustrate possible trends over the course of the conversation. To continue the previous example, the difference in opinion could be represented as a difference in scores, possibly for a specific topic; characters or plot for example. Regardless of how the difference in opinion is calculated, the analysis engine 101 can cause an output device (e.g., interface devices 102,103 or any other device capable of receiving data from the analysis engine 101 and providing an output to a user) to present the difference to observers at step 504.

The differences in opinion can reflect other properties of the on-line conversation as well. In some embodiments, the difference of opinion could reflect the differences among observers possibly where the observers rate or score how the conversation is going (e.g., votes, ranks, thumbs up, thumbs down, etc.). In more competitive conversations, the opinions could represent the opinions of judges that monitor or rate a conversational competition (e.g., argument, debate, review, etc.).

The difference in opinion could be presented according to any desired modality; a chart, a graph, a graphic, an image, a gauge, a virtual or augment reality object, or other modality. Such approaches are considered advantageous to illustrate a current state of the conversation or how the opinions change with time. Further, advertisements or other promotions can be presented based on the differences.

Aspects of the inventive subject matter are considered to contemplate: A method of curating conversation content comprising: providing access to a conversation management engine via a conversation interface, the conversation management engine configured to manage an on-line conversation; generating, by the conversation management engine, a conversation curation policy associated with the on-line conversation, the conversation curation policy comprising rules governing curation of conversation content; obtaining, by the conversation management engine, conversation content related to the on-line conversation; and configuring, by the conversation management engine, the conversation interface to present the conversation content according to the conversation curation policy.

The method of curating conversation content, wherein the step of generating the curation policy includes obtaining an a priori defined curation policy; wherein the step of generating the curation policy includes modifying a conversation curation policy template; wherein the conversation curation policy includes rules that filter the conversation content; wherein the conversation curation policy includes rules that modify the conversation content; wherein the conversation curation policy includes rules that enforce a conversation style; wherein the conversation curation policy includes rules governing placement of conversation content according to participant attributes; wherein the conversation curation policy includes rules governing placement of conversation content according to content attributes; wherein the conversation curation policy includes rules that inject conversation content into the on-line conversation; further comprising charging a fee for injecting new content into the on-line conversation, wherein the new content comprises an advertisement and wherein the advertisement is obtained according to the conversation curation policy; further comprising the conversation management engine allowing a sponsor to sponsor the conversation curation policy as a sponsored curation policy, auctioning access to the sponsored curation policy; further comprising the conversation management engine modifying the conversation curation policy after the conversation has begun, modifying the conversation curation policy in real-time based on the conversation content, modifying the conversation curation policy in real-time according to the conversation curation policy; wherein the conversation interface comprises at least one of the following: a browser enabled device, a mobile phone, a mobile computer, an appliance, and a game console; wherein the conversation content comprises at least one of the following types of data: audio data, video data, image data, link data, text data, metadata, rating data, voting data, and ranking data; wherein obtaining the conversation content includes receiving the conversation content from a remote device via the conversation interface.

Aspects of the inventive subject matter are considered to contemplate: An opinion tracking system comprising: a conversation interface configured to obtain conversation content related to an on-line conversation; an opinion database storing opinion metrics associated with the on-line conversation; and an opinion analysis engine coupled with the conversation interface and the opinion database, and configured to: derive an current opinion metric from the conversation content; calculate a difference in opinion as a function of the current opinion metric and at least one of the opinion metrics in the opinion database; and configure an output device to present the difference in opinion.

The opinion tracking system, wherein the conversation interface comprises at least one of the following: a web server, a mobile phone, an API, a web service, a mobile computer, a browser enabled device, an appliance, and a game console; wherein the conversation content comprises at least one of the following types of data: audio data, video data, image data, link data, text data, metadata, rating data, voting data, and ranking data; wherein the current opinion metric comprises a multi-valued opinion metric; wherein the multi-valued opinion metric comprises a vector and wherein the members of the vector represent a plurality of topics associated with the on-line conversation; wherein the difference in opinion reflects a difference between two participants in the on-line conversation; wherein difference in opinion reflects a change in opinion over time and wherein difference in opinion reflects a substantially real-time change in opinion; wherein difference in opinion reflects a difference among conversation observers; wherein difference in opinion reflects a difference among conversation judges; wherein the current opinion metric is derived as a function of a concept within the conversation content; wherein the current opinion metric represents a sentiment with respect to a topic associated with the on-line conversation; wherein the current opinion metric represents a position with respect to a topic associated with the on-line conversation; wherein the current opinion metric comprises an observer score; wherein the opinion analysis engine is further configured to store the current opinion metric within the opinion database; wherein the opinion analysis engine is further configured to present the difference in opinion in a graphical format; wherein the opinion analysis engine is further configured to present an advertisement via the output device where the advertisement is selected as a function of the difference in opinion; wherein the output device comprises the device interface; wherein the opinion analysis engine comprises at least one of the following: software as a service, platform as a service, a web service, a virtual server, a cloud-based service, and an application as a service.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A conversation management system comprising:
   a rules database storing a plurality of conversation rules sets each representing a conversation style and having conversation style attributes; and
   a conversation management engine coupled with the rules database and configured to: obtain conversation criteria having attributes relating to a conversation;
   use the conversation criteria to identify at least one conversation rules set within the rules database and having conversation style attributes that satisfy the conversation criteria;
   configure a conversation interface to present the conversation to at least one first participant from plurality of participants according to the at least one conversation rules sets;
   use a curation rules set based on a participant attribute associated with a second participant from the plurality of participants to modify the presentation of the conversation for the second participant; and
   configure the conversation interface to present the modified conversation to the second participant according to the at least one conversation rules set and the curation rules set.

2. The system of claim 1, wherein the at least one conversation rules set comprises a custom rules set.

3. The system of claim 1, wherein the at least one conversation rules set corresponds to at least one of the following conversation styles: a competitive debate, parliamentary debate, a decision making debate, an Oxford debate, a Mace debate, a Lets debate, a public debate, an Australasia debate, a WUPID debate, an Asian Universities debate, a policy debate, a classic debate, an extemporaneous debate, a Lincoln-Douglas debate, a Karl Popper debate, a simulated legislature debate, an impromptu debate, a mock trial, a moot courts, a public forum debate, and a Paris debate.

4. The system of claim 1, wherein the conversation criteria and conversation style attributes adhere to a common namespace.

5. The system of claim 1, wherein the conversation management engine comprises at least one of the following computing infrastructures: software as a service, platform as a service, a web service, a virtual server, a cloud-based service, and an application as a service.

6. The system of claim 1, wherein the conversation management engine is further configured to instantiate the conversation according to the at least one conversation rules set.

7. The system of claim 6, wherein the conversation is instantiated on a third party web platform.

8. The system of claim 6, wherein the conversation is instantiated on the conversation management engine.

9. The system of claim 1, wherein the modification to the presentation of the conversation for the second participant comprises an edit of submitted conversation content from other participants from the plurality of participants.

10. The system of claim 1, wherein the conversation management engine is further configured to provide conversation content via the conversation interface according to the at least one conversation rules set.

11. The system of claim 10, wherein the conversation content comprises at least one of the following types of data: audio data, video data, image data, link data, text data, metadata, rating data, voting data, and ranking data.

12. The system of claim 10, wherein the conversation management engine is further configured to configure the conversation interface to present promotions as conversation content based on at least one of the following: the conversation criteria, the conversation style attributes, and the conversation content.

13. The system of claim 1, wherein the conversation management engine is further configured to:
   analyze an existing conversation;
   derive attributes associated with the existing conversation; and
   obtain the conversation criteria based on the derived attributes.

14. The system of claim 1, wherein the conversation management engine is further configured to replace the conversation rules set of the conversation with a new conversation rules set based on user-submitted conversation content to the conversation.

15. The system of claim 13, wherein the obtained conversation criteria includes attributes different from and in addition to the derived attributes.

* * * * *